Patented Sept. 8, 1931

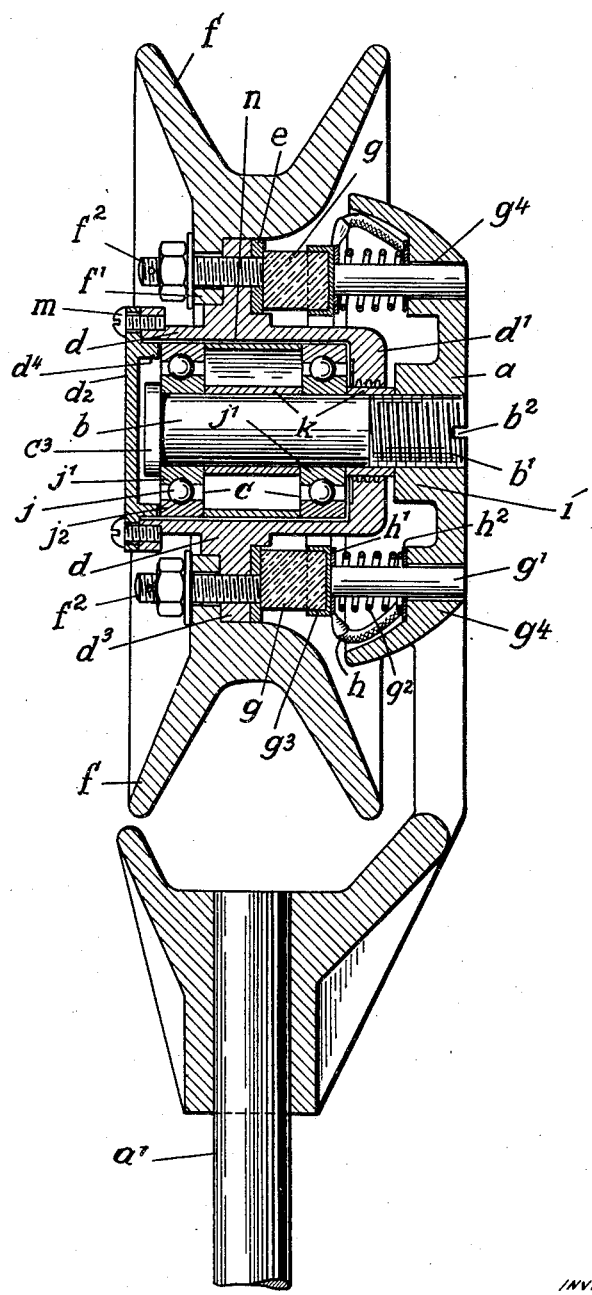

1,822,300

UNITED STATES PATENT OFFICE

ERNST KÖRNER, OF STUTTGART, GERMANY

TROLLEY

Application filed March 24, 1930, Serial No. 438,565, and in Germany May 28, 1929.

My invention relates to improvements in trolleys, and the object of the improvements is to provide a trolley in which the trolley wheel and its bearing may be readily removed from the head of the pole. With this object in view my invention consists in mounting the trolley wheel on a pivot bolt and fixing the said bolt to the head of the trolley pole from one side thereof and so that it can be removed from the said head together with the trolley wheel and its bearing. Other objects of the improvements will appear from the following description.

For the purpose of explaining the invention an example embodying the same has been illustrated in the accompanying drawing showing a sectional elevation of the trolley.

To the trolley pole $a^1$ a head or harp $a$ is secured and the said head is formed with a lug $i$ formed with an internally screw-threaded bore having a pivot bolt $b$ screwing therein, the said pivot bolt being passed through the whole length of the bore and being formed with a slot $b^2$ adapted for engagement with a screw driver. On the pivot bolt $b$ an anti-friction bearing is mounted which consists of inner race rings $j^1$, outer rings $j^2$, and balls $j$, the inner race rings $j^1$ being fixed to the bolt $b$ and held in position by means of a head $c^3$ of the bolt $b$ and sleeves $k$. The outer race rings $j^2$ are fitted within a cylindrical bore of a hub $d$ formed with an inwardly directed flange $d^1$ embracing the inner sleeve $k$ and having a lid $d^2$ secured thereto by means of screws $m$, the said flange and lid confining the anti-friction bearing in a dust and oil proof manner. The race rings $j^2$ are held in position within the hub by means of the flange $d^1$, a sleeve $n$ and a flange $d^4$ projecting inwardly from the lid $d^2$. The hub $d$ is formed at its middle with a flange $d^3$, and to the said flange the ring $f$ of the trolley wheel is secured for example by means of screws $f^2$.

To the inner face of the flange $d^3$ an annular disk $e$ of hard copper or the like is secured by means of the screws $f^2$. The ring $e$ is engaged by a current collector ring $g$ made from carbon or the like and having its outer portion fitted in a flanged ring $g^3$ secured to bolts $g^1$ slidingly engaging in bores $g^4$ of the head $a$, springs $g^2$ being disposed between the ring $g^3$ and the inner face of the head $a$ for holding the collector ring $g$ in contact with the ring $e$. Preferably the ring $g$ is electrically connected with the head $a$ by means of flexible leads $h$ fixed to washers $h^1$ and $h^2$ making contact respectively with the ring $g^3$ and the head $a$, the springs $g^2$ bearing on the rings $h^1$ and $h^2$ for holding the same in electrical contact with the ring $g^3$ and the head $a$.

If it is desired to replace the trolley with another one it is only necessary to screw the bolt $b$ outwardly by means of a screw driver set into the notch $b^2$, whereupon the said bolt, the anti-friction bearing and the trolley wheel mounted thereon are removed from the head $a$. After dismounting the bolt $b$ and the parts carried thereby from the head the collector ring may be inspected, and it can be readily replaced with another collector ring if necessary. Further the springs $g^2$ can be inspected. If it is desired to remove only the ring $f$ of the trolley wheel the nuts of the screws $f^2$ are removed, whereupon the rim can be readily withdrawn from the flange $d^1$. In a similar way the rim of the trolley or the whole trolley are again mounted on the flange $d^3$ or the head $a$.

I claim:

1. A trolley, comprising the head of the trolley pole, a bearing member fixed to said head, a hub rotatable on said bearing member and formed with a flange, a trolley wheel and a ring of conductive material fixed to said flange from opposite sides thereof, and a collector ring in frictional engagement with said ring of conductive material and mounted on said head.

2. A trolley, comprising the head of the trolley pole, a bearing member fixed to said head, a trolley wheel mounted on said bearing member, a collector ring in sliding engagement with said trolley wheel, bolts carrying said collector ring and slidably supported in bores of said head, springs acting on said collector ring for forcing the same into engagement with said trolley wheel, washers located between the ends of said springs and said collector ring and head, and a flexible conductor electrically connecting said washers.

3. A trolley, comprising the head of the trolley pole, a bearing member fixed to said head, a hub rotatable on said bearing member and formed with a flange, a trolley wheel and a ring of conductive material fixed to said flange from opposite sides thereof, and electrical contact means in engagement with said ring and mounted on said head.

4. In apparatus of the class described, the combination with a trolley harp, of a stud having threaded connection with said harp, and a trolley assembly mounted on said stud and removable bodily therewith from said harp, said assembly comprising anti-friction bearing means on said stud, a hub member journalled on said bearing means and constituting a closure therefor, said hub member being provided with an annular radially disposed flange, a trolley rim secured one side of the flange on said hub member, and electrical contact means carried by said harp and yieldingly engaging the opposite side of the said flange.

5. In apparatus of the class described, the combination with a trolley harp, of a stud having threaded connection with said harp, and a trolley assembly mounted on said stud and removable bodily therewith from said harp, said assembly comprising anti-friction bearing means on said stud, and a hub member journalled on said bearing means and constituting a closure therefor, said hub member being provided with an annular radially disposed flange, a trolley rim in engagement with one side of the flange on said hub member, a current conducting annular plate engaging the opposite side of the said flange, means for detachably securing said trolley rim, hub flange and plate together, and electrical contact means carried by said harp and yieldingly engaging said plate.

In testimony whereof I hereunto affix my signature.

ERNST KÖRNER.